United States Patent [19]

Green

[11] Patent Number: 4,487,215

[45] Date of Patent: Dec. 11, 1984

[54] GAS VENTING VALVE

[75] Inventor: Charles J. Green, Vashon, Wash.

[73] Assignee: GT Development Corporation, Tukwila, Wash.

[21] Appl. No.: 526,419

[22] Filed: Aug. 25, 1983

[51] Int. Cl.³ .............................................. F16K 17/36
[52] U.S. Cl. ...................................... 137/43; 137/39; 137/202; 137/331
[58] Field of Search ...................... 137/39, 43, 44, 202, 137/331

[56] References Cited

U.S. PATENT DOCUMENTS 4,325,398 4/1982 Green ..................................... 137/39

Primary Examiner—Robert G. Nilson
Attorney, Agent, or Firm—Delbert J. Barnard

[57] ABSTRACT

Venting gas flow from a fuel tank or the like enters through tangential inlets into a spin chamber, influencing a closure ball in said chamber to spin or orbit around an upper conical wall portion of the spin chamber. The spinning action keeps the closure ball from seating in an outlet opening formed at the upper end of the spin chamber. The closure ball does seat in response to liquid rising in the spin chamber or tilting of the spin chamber beyond a predetermined angle of tilt. A vibrating mass positioned on the outlet side of the outlet opening includes a central striker portion which contacts the closure ball whenever it tends to seat in response to shock forces or some condition other than the presence of liquid activated buoyancy forces or tilt activated gravity forces.

15 Claims, 6 Drawing Figures

GAS VENTING VALVE

DESCRIPTION

1. Technical Field

The present invention relates to a gas venting valve of the general type disclosed by my U.S. Pat. No. 4,325,398, granted Apr. 20, 1982, and entitled Safety And Venting Valves For Fuel Tanks Carried On Vehicles, and by my copending application Ser. No. 353,489, filed Mar. 1, 1982, now U.S. Pat. No. 4,457,325, and entitled Safety And Venting Cap For Vehicle Fuel Tanks. More particularly, the present invention relates to the provision of a gas venting valve of a type including a closure ball that is seated by liquid forces, but which following a closure caused by a fuel slosh will not stay closed. Rather, the valve is adapted to quickly and efficiently unseat the closure ball and resume venting in response to normal venting conditions.

2. Background Art

Reference is made to my aforementioned U.S. Pat. No. 4,325,398, and to my aforementioned copending application Ser. No. 353,489, for a discussion of the need for gas vent valves, and for a disclosure of the known prior art. The patents which were cited against my U.S. Pat. No. 4,325,398, and the patents which are discussed by me in my copending application Ser. No. 353,489, should be carefully studied for the purpose of putting the present invention into proper perspective relative to the prior art.

DISCLOSURE OF THE INVENTION

In accordance with a basic aspect of the present invention, a closure ball is provided of a type which is caused to spin by venting gases, and while so spinning is influenced by the sidewall shape of the upper portion of a spin chamber away from a seated position within an outlet opening formed at the upper end of the spin chamber.

A first basic aspect of the invention is the provision of a vibrating mass on the outlet side of the outlet opening, which functions to easily and quickly unseat the closure ball whenever it has become seated, and there is neither liquid near the outlet opening nor an unnormal tilting condition warranting operation of the closure ball to close the outlet opening. The vibrating mass is normally supported by a calibrated spring into a position spaced from the outlet opening. The density of the mass and the calibration of the spring are such that normal vibrations of the vehicle or other equipment into which the gas venting valve has been installed will cause the mass to vibrate with an amplitude sufficient to cause the mass to make contact with the closure ball whenever the closure ball is seated within the outlet opening. The force developed by the vibrating mass is always sufficient to dislodge the closure ball from its seated position, including when liquid forces exist for seating the closure ball, and when the installation is tilted an amount sufficient to produce gravity forces which move the closure ball into its seated position. However, at times when the mass is not vibrating, the liquid and/or gravity forces will hold the closure ball in its seated position.

In accordance with another important aspect of the invention, the upper portion of the spin chamber includes a conical surface which innersects a radial wall in which the outlet opening is formed. The radial wall provides a small lip between the outlet opening and the conical surface. The closure ball may contact with this lip while it is still spinning and in contact with the conical upper surface of the spin chamber. Then, immediately upon the closure ball becoming unseated, it rolls down over this lip and makes contact with the conical surface and commences spinning.

The gas vent valve of this invention performs very efficiently even when subjected to high vibration and shock levels. If the closure ball is bounced or sloshed into a seated position, it does not remain seated and when unseated it immediately resumes a spinning action in response to venting gas flow.

Further objects and advantages of the invention are set forth in the description of the preferred embodiment, and are particularly pointed out and distinctly claimed in the appended claims.

BRIEF DESCRIPTION OF THE DRAWING

In the drawing, like element designations refer to like parts, and

BEST MODE FOR CARRYING OUT THE INVENTION

Figure 1:
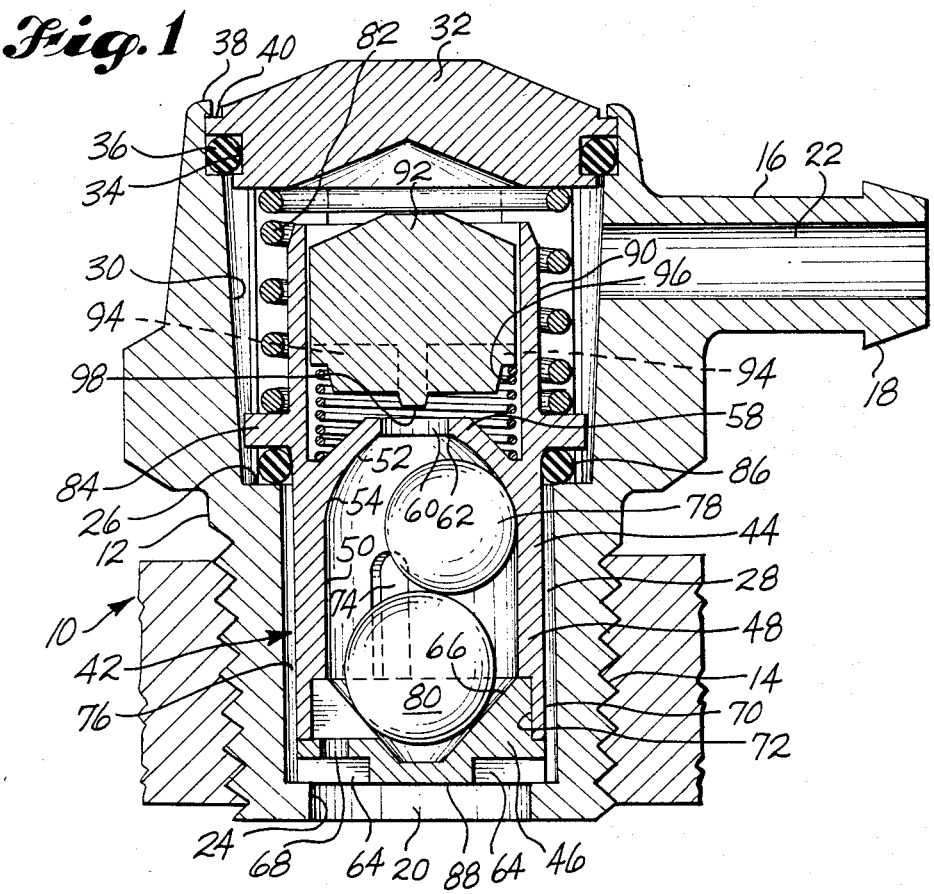
FIG. 1 is an axial sectional view taken along line 1—1 of FIG. 2, showing the static position of the various elements of the illustrated embodiment.

In preferred form, the gas vent valve 10 of this invention comprises a tubular housing 12 having a two part inner chamber and an externally threaded lower portion 14. The upper portion of the housing 12 may include a laterally projecting nipple 16, adapted to slip fit into a vent hose (not shown). The outer end portion 18 of the nipple 16 is shown to include a conventional structure for engaging an inner wall portion of a hose.

The lower end of the housing 12 includes an end opening 20 which functions as an inlet for the vent valve. A passageway 22 in the nipple 16 functions as an outlet for the vent valve. The vent passageway starts with the inlet 20, includes yet to be described structure within the housing 12, and ends with the vent hose (not shown) which is attached to the nipple 16.

A radially inwardly directed lip 24 is provided at the lower end of housing 12. A radial shoulder 26 divides the interior of the housing 12 into a small diameter lower portion 28 and a larger diameter upper portion 30. The upper end of the housing 12 may be closed by a closure wall 32, formed to include a peripheral groove 34 in which an O-ring seal 36 is situated. The upper edge 38 of housing 12 may be crimped over an edge portion 40 of closure 32, for securing closure 32 in place and exerting a sufficient amount of compression on seal ring 36 to enable it to seal against fluid leakage between closure 32 and housing 12. Alternatively, O-ring seal 36 may be replaced by a seal ring constructed from a material that will melt at a predetermined low temperature, e.g. 225° F., such as is disclosed in my aforementioned U.S. Pat. No. 4,325,398.

A second internal housing 42 (FIG. 1) is positioned within chambers 28, 30 of housing 12. Housing 42 is of two part construction. It includes an upper major part 44 and a lower minor part 46.

Housing 12 and closure 32 are preferably constructed from metal. Housing parts 44, 46 are preferably constructed from plastic.

Housing part 44 includes a lower tubular portion 48 which defines what is hereinafter referred to as a "spin chamber". The spin chamber has upper and lower parts. The lower part 50 of the spin chamber is cylindrical in shape. The upper part 52 of the spin chamber is conical in shape. The cylindrical and conical portions of the spin chamber are interconnected by a smoothly curving transitional region 54. The conical surface 52 of the spin chamber is the inner surface of a conical wall 56 which extends both inwardly and upwardly from sidewall 48. The upper end of the spin chamber is defined by a radial wall 58 in which a central outlet opening 60 is formed. The portion of radial wall 58 remaining around the opening 60 is relatively small, but it provides a lip 62 (FIGS. 1 and 4-6) which surrounds the outlet opening 60 and performs an important function, as will hereinafter be described in detail.

The lower minor portion 56 of the housing 42 is essentially identical in construction to part 28 described in my aforementioned U.S. Pat. No. 4,325,398. It includes radial legs 64 which rest on the housing lip 24, a conical inner surface 66, and a drain opening 68. A cylindrical upper portion 70 of member 46 snuggly fits into a socket 72 formed in the lower end of member 44.

Sidewall 48 of member 44 is provided with at least one, but preferably two, tangential inlets 74, located below the curve 54. Gas venting upwardly through inlet 20 flows radially outwardly through the spaces defined between the leg 64 into an annular chamber 76 which is defined by and between the lower wall of housing 12 and the lower wall 46 of housing 42. The gases then flow from chamber 76, through tangential inlets 74 and develop spinning currents which swirl around the spin chamber as they rise upwardly to eventually flow out of the chamber through outlet opening 60.

The swirling gas currents contact a closure ball 78 and cause the ball to spin around first surface 54 and then surface 52. As the ball 78 rises it spins at a faster rate because it is forced radially inwardly by the decreasing diameter of the spin chamber wall. The wall imparts a downwardly directed component of reaction force to the centrifugal force developed by the ball as it spins. This downwardly directed component of force is sufficient to prevent the ball 78 from seating while it is spinning in response to normal gas flow through the vent passageway.

Figure 4:
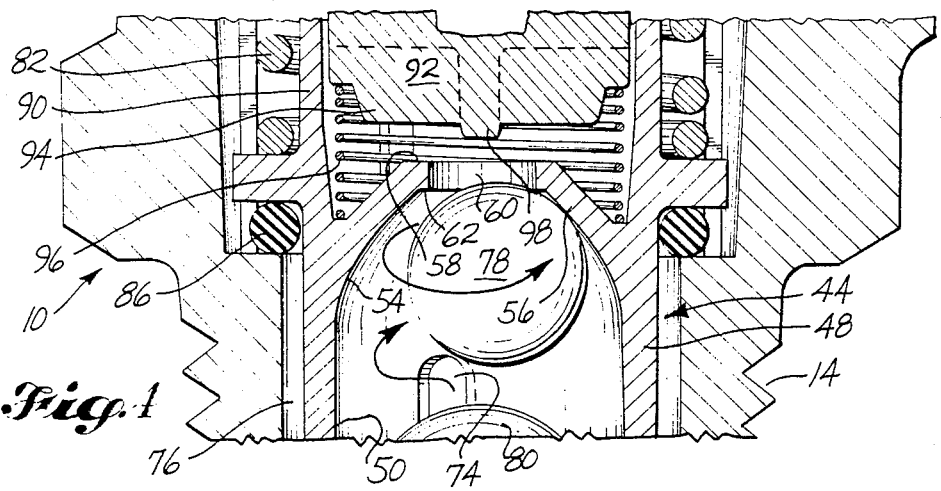
FIG. 4 is a fragmentary axial sectional view, showing the closure ball spinning in response to gas flow through the gas vent passageway.
Figure 5:
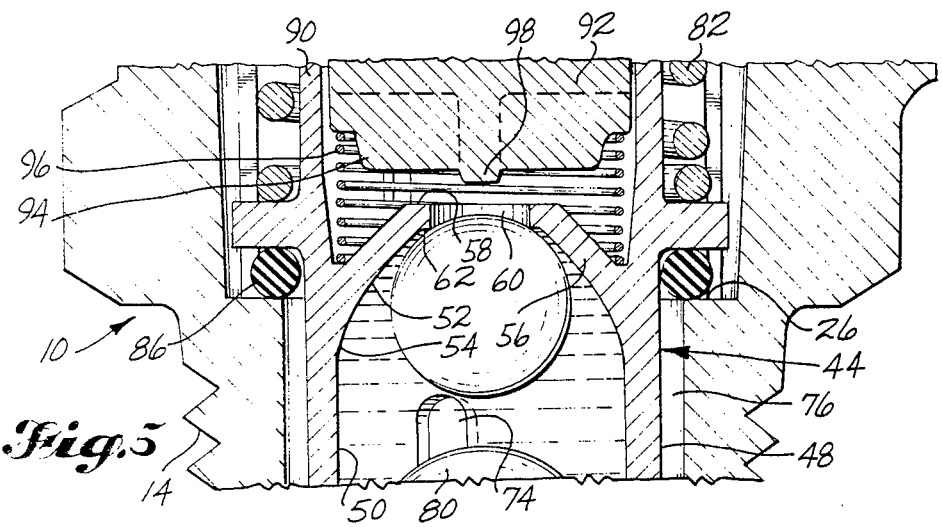
FIG. 5 is a view like FIG. 4, but showing the closure valve in a seated position.
Figure 6:
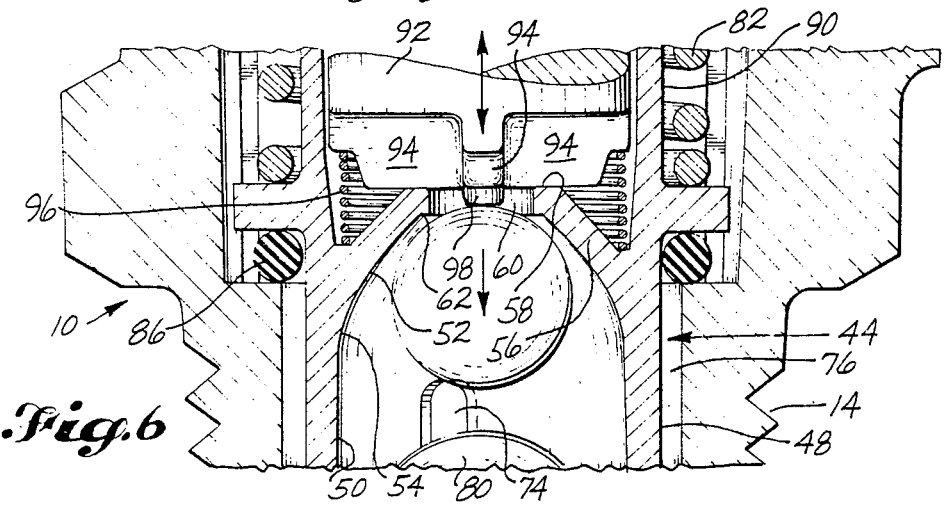
FIG. 6 is a view like FIG. 5, but showing the vibrating mass in its lower position, with its central portion in contact with the closure ball, and functioning to unseat the closure ball.

In contrast to the arrangement disclosed by my aforementioned U.S. Pat. No. 4,325,398, the conical upper portion 52 of the spin chamber wall intersects the radial wall 58 quite close to the edges of the outlet opening 60. As best shown by FIG. 4, a quite small edge or lip 62 is formed immediately around the outlet opening 60, by the small amount of radial wall 58 which exists between the outlet opening 60 and the conical region 52. Owing to this arrangement, the closure ball 78 is still spinning and influenced away from a seated position even when in contact with the edge of the outlet opening 60. As a result, the ball 78 will be caused to spin and by the spinning action will be influenced away from seating in the outlet opening 60 immediately upon its movement out from a seated position and down over the lip 62.

In preferred form, the closure ball 78 is constructed from a lightweight buoyant material and preferably it rests on a lower heavy ball 80 which may be constructed from stainless steel, for example. This arrangement of the two balls is like the arrangement disclosed in my aforementioned U.S. Pat. No. 4,325,398. The buoyant ball 78 spins in response to gas venting through the vent passageway and it floats upwardly and seats in response to liquid flow into the spin chamber, while the ball 80 sits and does nothing. Ball 80 functions in response to the valve tilting beyond a predetermined amount to roll up the sidewall of the spin chamber and force the closure ball into a seated position. This function is very well described in U.S. Pat. No. 4,325,398 and thus will not be repeated.

In similar fashion to the arrangement disclosed in U.S. Pat. No. 4,325,398, a compression spring 82 is located between the closure 32 and a radial flange 84 which projects outwardly from housing 42. The spring 82 biases the housing 42 downwardly, compressing an O-ring seal 86 into sealing engagement with the lower surface of flange 84 and the surface of shoulder 26. However, in response to abnormally high pressures acting on the lower surface 88 of housing 42, this arrangement allows the housing 42 to move upwardly, compressing spring 82, and allowing the pressures to be vented through a passage which is created between the seal 86 and the shoulder 26.

In accordance with an aspect of the invention, the housing 42 is provided with a tubular upper portion 90, which is an upward extension of wall 48, extending above the conical wall 56. Tubular extension 90 forms a guide for a mass 92. Mass 92 may include a main body portion having a cross sectional configuration which corresponds to the cross sectional configuration of an axial guideway formed within tubular extension 90. As a result of this arrangement, the mass 92 can move axially up and down within extension 90. In other words, extension 90 functions as a guide for the mass 92, guiding it for up and down sliding movement.

Preferably also, the lower end of the mass 92 is provided with a plurality (e.g. four) legs 94, which when the mass 92 is in its lower most position, contact the radial wall 58. Passageways are defined between the legs 94, so that when the mass 92 is moved downwardly, with the legs 94 in contact with wall 58, gas flow can continue out through outlet opening 60, through these passageways.

Figure 3:
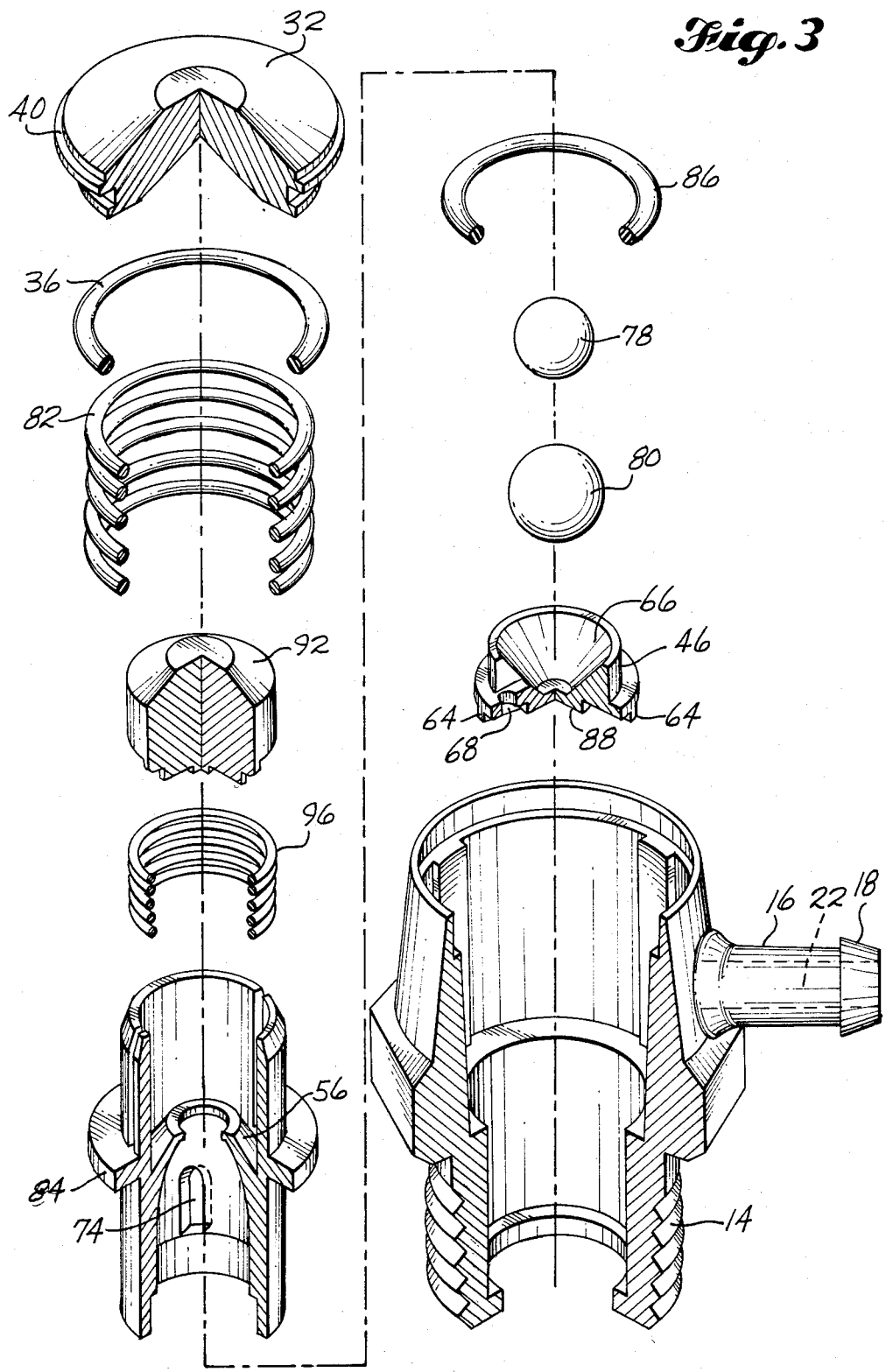
FIG. 3 is an exploded pictorial view of the illustrated embodiment.

Wall 90 is provided with one or more axial slots 91 (FIG. 3) or some other suitable form of sidewall opening(s), to allow the gas to continue to flow onto passageway 22.

Figure 2:
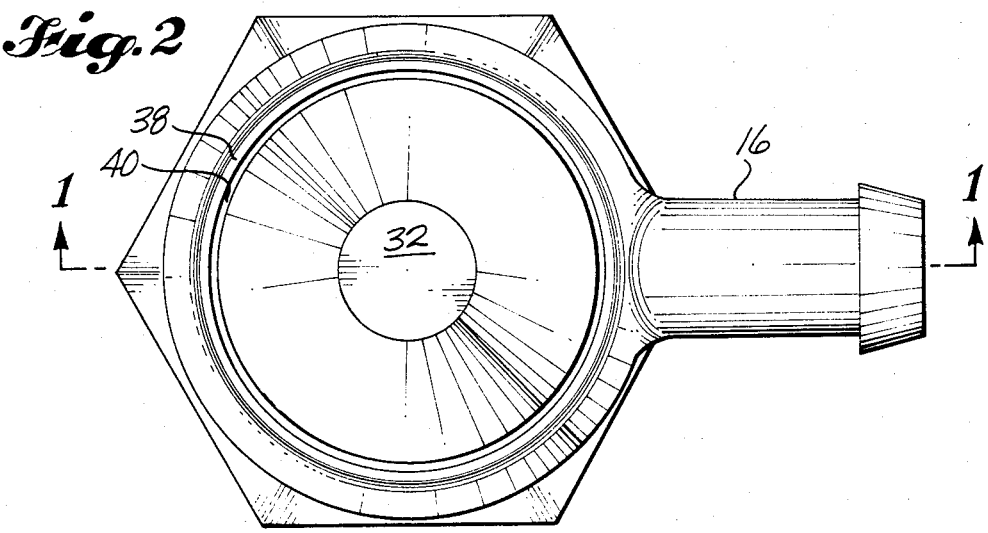
FIG. 2 is a top plan view of the illustrated embodiment.

Mass 92 is normally supported in the position shown by FIG. 2, by means of a coil spring 96 which is positioned between the outer region of wall 56 and an outer region of mass 92, in the manner illustrated. The spring 96 is collaborated so that it will allow means 92 to vibrate up and down in response to movement of the installation of which the vent valve is a part. For example, in a typical installation, in which the vent valve is installed in the fuel tank of a road vehicle, the mass 92 will vibrate up and down in response to normal vehicle vibration.

Mass 92 includes a downwardly projecting center portion 98 which is positioned to make contact with the closure ball 78 whenever the closure ball 78 is seated in the outlet opening 60 and the amplitude of vibration of the mass 92 exceeds a predetermined minimum amount, within the range of normal vehicle vibration.

The energy developed in the vibrating mass 92 is not sufficient to unseat the closure ball 78 when the closure ball 78 is being seated in response to liquid forces in the spin chamber. However, if the closure ball 78 tends to stick in a seated position after the liquid level in the spin chamber has dropped, there is sufficient energy in the vibrating mass 92 to dislodge the closure ball 78 from a seated position within the outlet opening 60. The spring 96 and the mass 92 are chosen such that the normal vibrations that will be developed by vehicle travel over a relatively smooth road will develop enough energy in the mass 92 to cause it to unseat closure valve 78 immediately upon member 98 contacting closure valve 78, immediately following a drop of liquid level in the spin chamber. As earlier explained, the improved configuration of the surfaces 52, 54, and the relationship of surface 52 to lip 62 and the closure opening 60, result in the closure balls spinning in response to gas flow through the vent passageway, immediately following an unseating of the closure ball 78 and its movement down over the lip 62.

As clearly shown, the striker portion 98 of mass 92 is smaller in diameter than the closure opening 60, so that it does not block gas flow through the closure opening when the mass 92 is in its lower most position, with the legs 94 in contact with wall 58.

In a second embodiment, the closure ball 78 may be constructed from some substances which is heavier than the liquid, such as a dense rubber or rubber-like substance. The spinning gas currents will still function to spin the heavier ball 78 and prevent it from seating, even though the ball 78 is denser than the liquid. In this embodiment, the lower ball 80 is made from a buoyant material. Then, as liquid flows up into the spin chamber, such liquid will cause ball 80 to float. As ball 80 floats upwardly, it pushes closure ball 78 upwardly with it, and into a seated position within the outlet opening 60. Also, in this embodiment, it is the gravity forces acting on closure ball 78 which moves closure ball 78 into a seated position in response to a tilting action of the installation beyond a predetermined angle of tilt.

It is intended that the embodiments which have been illustrated and/or described are presented not in a limiting sense, but as being illustrative of the invention, and the scope of the invention is to be solely determined by the appended claims.

What is claimed is:

1. A tank vent passageway adapted to permit gas flow but closed to liquid flow, said passageway having a normally lower inlet and a normally upper outlet, and comprising:
    wall means defining a spin chamber positioned between said inlet and said outlet, having internal generally circular cross sections;
    a circular outlet opening at the upper end of said spin chamber;
    a closure ball in said chamber, said ball having a larger diameter than said outlet opening;
    at least one sidewall inlet opening into said chamber, tangentially directed with respect to said chamber cross sections, whereby gas flow through said inlet opening and through the spin chamber will spin the closure ball around the chamber, resulting in said closure ball being dynamically influenced away from seating in said outlet opening;
    liquid flow responsive means acting on said ball, for lifting said ball to seat on said outlet opening when liquid enters said chamber to a predetermined level, to in that manner close said outlet opening and block liquid flow out through the outlet opening;
    a mass on the side of the outlet opening opposite the closure ball;
    guide means for said mass, guiding said mass for axial movement towards and away from the outlet opening;
    spring means normally positioning said mass into a position spaced away from said closure opening, but permitting the mass to vibrate towards and away from the outlet opening in response to movement of a structure into which the tank vent passageway has been incorporated; and
    said mass including a center portion positioned to make contact with the closure ball when the closure ball is seated in said outlet opening and the vibration amplitude of the mass exceeds a predetermined amount.

2. The invention according to claim 1, wherein said closure ball is buoyant and such buoyancy provides the liquid responsive force means which functions when liquid enters the chamber to seat the closure ball.

3. The invention according to claim 2, including a heavy ball in said chamber normally below the closure ball, functioning to move against said closure ball and move it into a seated position in the outlet opening and hold it in said seated position when the chamber has been tilted a predetermined amount.

4. The invention according to claim 1, wherein said guide means for said mass is in the form of a tube and the mass is housed within and guided by said tube.

5. The invention according to claim 4, wherein said tube includes at least one sidewall opening constituting a portion of the tank vent passageway.

6. The invention according to claim 1, wherein the center portion of the mass is smaller in cross section than the outlet opening and said mass includes passageway means spaced about said center portion through which gas can flow even if the mass were to be in a position down in contact with the upper end of the chamber.

7. The invention according to claim 1, wherein said closure ball has a density greater than the liquid that might enter the chamber, and a second buoyant ball is provided in said chamber, below said closure ball, and said buoyant second ball provides the liquid responsive force means which functions when liquid enters the chamber to seat the closure ball.

8. A passageway adapted to permit gas flow but closed to liquid flow, said passageway having a normally lower inlet and a normally upper outlet, and comprising:
    wall means defining a spin chamber positioned between said inlet and said outlet, and having internal circular cross sections;
    a circular outlet opening at the upper end of said chamber;
    said internal circular cross sections progressively decreasing in diameter in the upward direction, giving the spin chamber a conically shaped upper portion, said spin chamber including a radial endwall at its upper end in which the outlet opening is formed, defining a lip extending about the outlet opening;

a closure ball in said spin chamber, said ball having a larger diameter than said outlet opening;

at least one side wall inlet opening into said spin chamber which is tangentially directed with respect to said chamber cross sections, whereby gas flow through said inlet opening and through said spin chamber will spin the closure ball around the spin chamber and dynamically influence it away from seating in said outlet opening, including when said closure ball is both still in contact with the conical upper portion of the spin chamber and the lip surrounding the outlet opening; and liquid flow responsive force means acting on said closure ball, for lifting said closure ball to seat in said outlet opening when liquid enters said chamber to a predetermined level, to in that manner close said outlet opening and block liquid flow out through the outlet opening.

9. The invention according to claim 8, wherein said closure ball is lightweight and buoyant and such buoyancy provides a liquid response force means which functions when liquid enters the chamber to seat the closure ball.

10. The invention according to claim 9, including a heavy ball in said chamber normally below the closure ball, functioning to move against said closure ball and move it into a seated position in the outlet opening and hold it in said seated position when the chamber has been tilted a predetermined amount.

11. The invention according to claim 8, wherein said closure ball has a density greater than the liquid that might enter the chamber, and a second buoyant ball is provided in said chamber, below said closure ball, and said buoyant second ball provides the liquid responsive force means which functions when liquid enters the chamber to seat the closure ball.

12. The invention according to claim 8, wherein said wall means defining the spin chamber includes an external generally radial flange in the general vicinity of the outlet opening, and wherein the tubular valve housing includes an internal radial shoulder generally at the upper end of the threaded portion of the housing, and said tubular valve housing includes a lower end, inwardly directed radial flange surrounding the inlet opening, and the said wall means defining the spin chamber includes a lower portion which sits down on said flange, wherein an O-ring seal is provided between the external radial flange carried by the wall means which defines the spin chamber and the radial shoulder defined within the tubular valve housing.

13. The invention according to claim 12, comprising a closure for the upper end of the tubular valve housing, and a compression spring between said closure and the external radial flange carried by the wall means defining the spin chamber, for biasing such flange into sealing contact with said O-ring seal.

14. The invention according to claim 13, wherein the upper end outlet opening is a laterally directed opening positioned below said closure means.

15. The invention according to claim 14, wherein said upper end outlet opening is in the form of a laterally extending nipple, adapted for attachment to a vent line.

* * * * *